United States Patent [19]

Ranck

[11] 3,975,573

[45] Aug. 17, 1976

[54] POLYESTER FILM COATED WITH AN INORGANIC COATING AND WITH A VINYLIDENE CHLORIDE COPOLYMER CONTAINING A LINEAR POLYESTER RESIN

[75] Inventor: Ralph Oliver Ranck, Richmond, Va.

[73] Assignee: E. I. Du Pont de Nemours and Company, Wilmington, Del.

[22] Filed: Jan. 13, 1975

[21] Appl. No.: 540,941

Related U.S. Application Data

[60] Division of Ser. No. 377,087, July 6, 1973, Pat. No. 3,896,066, which is a continuation-in-part of Ser. No. 356,442, May 2, 1973, abandoned.

[52] U.S. Cl.............................. 428/480; 428/522; 428/539; 428/911
[51] Int. Cl.².................... B32B 27/36; B32B 27/30
[58] Field of Search .......... 428/522, 518, 480, 483, 428/539, 911

[56] References Cited

UNITED STATES PATENTS

| 2,853,464 | 9/1958 | Dilke et al. .................. 260/45.4 |
| 3,136,681 | 6/1964 | Johnston ...................... 428/241 |
| 3,676,185 | 7/1972 | Phillips et al. ............... 428/518 X |
| 3,821,014 | 6/1974 | Haskell et al. ............... 428/522 X |
| 3,853,587 | 12/1974 | Haskell et al. ............... 428/539 X |
| 3,853,591 | 12/1974 | Haskell et al. ............... 428/539 X |

*Primary Examiner*—Harold Ansher

[57] ABSTRACT

A polyester film having an inorganic coating and an overcoating which contains
1. a vinylidene chloride copolymer, and
2. a minor amount of a linear polyester resin prepared by condensing a glycol and a polyfunctional acid, at least 70% of the polyfunctional acid being an aromatic acid. The overcoating adheres to the inorganic coating as well the side of the polyester film not having the inorganic coating.

3 Claims, No Drawings

POLYESTER FILM COATED WITH AN INORGANIC COATING AND WITH A VINYLIDENE CHLORIDE COPOLYMER CONTAINING A LINEAR POLYESTER RESIN

CROSS REFERENCE TO RELATED APPLICATIONS

This application is a divisional of application Ser. No. 377,087 filed July 6, 1973, now U.S. Pat. No. 3,896,066 which in turn is a continuation-in-part of application Ser. No. 356,442 filed May 2, 1973, now abandoned.

BACKGROUND OF THE INVENTION

This invention relates to polyester articles having improved barrier properties and heat sealability, and more particularly relates, in a preferred embodiment, to polyester packaging films coated with a saran composition.

Polyester films, and especially polyethylene terephthalate films oriented by stretching and/or drawing in both directions, are versatile materials due to their high strengths and general chemical inertness. These films have been somewhat deficient for use in packaging, however, due to their poor heat sealability and relatively high water vapor permeability.

The term saran applies to a family of vinylidene chloride homopolymers and copolymers with other ethylenically unsaturated monomer(s). Saran is a well known coating material used to impart water vapor impermeability and heat sealability to various substrates, including packaging films. When used as a barrier coating on polyester films, however, the saran has a tendency to delaminate from the film. This delamination has somewhat restricted the usefulness of saran coated polyester films despite their otherwise excellent properties.

SUMMARY OF THE INVENTION

It has now been found that a coating composition containing saran forms a tack-free barrier coating with improved adhesion to a polyester substrate, as well as inorganic coatings present on the polyester substrate, when the vinylidene chloride polymer component of the coating contains at least about 80% by weight vinylidene chloride and the coating composition contains about 0.1 to 6% by weight, based on the vinylidene chloride polymer, of a linear polyester resin prepared by condensing a glycol and a polyfunctional acid, at least 70% by weight of said polyfunctional acid being an aromatic polyfunctional acid.

A polyester film having an organic coating and an overcoating of a continuous, adherent, tack-free, heat-sealable coating containing:

1. a copolymer of vinylidene chloride and at least one other ethylenically unsaturated monomer copolymerizable therewith, said copolymer containing at least 80% by weight of vinylidene chloride, and 2. about 0.1 to 6% by weight, based on said vinylidene copolymer, of a linear film-forming polyester having a molecular weight of at least about 500 prepared by condensing a glycol and a polyfunctional acid, at least 70% by weight of said polyfunctional acid being an aromatic polyfunctional acid.

DESCRIPTION OF THE PREFERRED EMBODIMENTS

Copolymers of vinylidene chloride and at least one other ethylenically unsaturated monomer are well known in the art for use in saran coating compositions. Representative monomers useful in preparing these vinylidene chloride copolymers include: acrylic acid; acrylates such as methyl, ethyl, isobutyl, butyl, and 2-ethyl hexyl acrylates; methacrylates such as methyl, phenyl, cyclohexyl, methoxyethyl and chloroethyl methacrylate; methyl alpha-chloracrylate; methyl isopropenyl ketone; acrylonitrile; methacrylonitrile; methyl vinyl ketone; vinyl chloride; vinyl acetate; vinyl propionate; vinyl chloracetate; vinyl bromide; styrene; vinyl naphthalene; ethyl vinyl ether; N-vinyl phthalimide; N-vinyl succinimide; N-vinyl carbazole; acrylamide; methacrylamide; phenyl vinyl ketone; diethyl fumarate; methacrylic acid; itaconic acid; dimethyl itaconate; and the like. The most useful monomers fall within the general formula

where R is hydrogen, halogen, or a saturated aliphatic radical, and X is one of —Cl, —Br, —F, —CN, —C$_6$H$_5$, —COOH,

—HC=O, —OC$_6$H$_5$, —CONH$_2$, —CONH-R' and —CONR'$_2$ where R' is alkyl.

Copolymers of vinylidene chloride with an ethylenically unsaturated monomer are generally described in terms of the weight ratio of the monomer units in the copolymer. For purposes of this invention, the vinylidene chloride content should be at least 80% to obtain a tack-free coating, and preferably at least 88% for optimum barrier properties. By "barrier properties" is meant that the copolymer is relatively impermeable to water vapor. In general, the vinylidene chloride content should not exceed about 94% as copolymers of higher vinylidene chloride content have poorer heat sealability, although they have excellent barrier and tack-free properties. Useful copolymers generally have an intrinsic viscosity of at least 1.3 as measured on a 1% concentration of copolymer in tetrahydrofuran at 25°C.

It has now been found that adhesion bonding between a vinylidene chloride copolymer coating, as described hereinabove, and a polyester substrate is markedly improved when the coating also contains about 0.1 to 6%, and preferably 0.5 to 2%, by weight, based on the vinylidene chloride copolymer, of a linear polyester resin prepared by condensing a glycol and a polyfunctional acid, at least 70% by weight of said polyfunctional acid being an aromatic polyfunctional acid. The improved adhesion bonding is achieved without unduly affecting recognized properties of the vinylidene chloride coating such as low water vapor permeability and good heat sealability.

Linear polyester resins, which can contain up to 30% by weight of an aliphatic polyfunctional acid, are well known in the art and are generally prepared by condensing the selected acid(s) with a diol of the formula $$HOCH_2(CH_2)_xCH_2OH$$

where $x$ is 0 to 10. Particularly useful diols include ethylene glycol and propane 1-3 diol.

Generally both the aromatic acid and aliphatic acid, if present, will be diacids to produce a linear polyester. Thus, the aromatic acid is generally at least one of naphthalene dicarboxylic acid, isophthalic acid, or terephthalic acid. The aliphatic diacid, if present, is generally an acyclic dicarboxylic acid of the formula $$HOOC-CH_2-X-CH_2-COOH,$$

where X is a chain of 2 to 8 carbon atoms, such as adipic acid, sebacic acid, or succinic acid.

Useful linear polyester resins are capable of forming films and thus have a molecular weight greater than about 500. The molecular weight must be low enough, however, that the polyester resin is soluble in the solvent medium selected for the coating composition. Polyester resins within this molecular weight range have no plasticizing effect on the vinylidene chloride copolymer as evidenced by similar heat seal temperature obtained irrespective of the presence of the polyester.

Linear copolyesters disclosed in U.S. Pat. No. 2,892,747 to John Dye have proven to be particularly useful in practicing the invention. These copolyesters are trans-esterification products of the lower alkyl esters of terephthalic acid, isophthalic acid, and at least two acyclic dicarboxylic acids such as adipic acid, azelaic acid, and sebacic acid. Commercially available polyesters which can be selected with advantage include epoxy modified polyester resins. Other useful polyester resins include "Vitel" PE 100 sold by Goodyear Chemical Company.

Conventional vinylidene chloride coating compositions are first dissolved in a solvent such as tetrahydrofuran, toluene, methyl ethyl ketone, or mixtures thereof, and then applied to the desired substrate, followed by drying to remove the solvent. Conveniently, the linear polyester is added to the vinylidene chloride bath, preferably after having been dissolved in the same solvent as is present in the coating bath. Conventional saran coating additives, such as wax, particulates (talc, aluminum silicates, insoluble polymers, and the like), and antistatic agents can be added prior to or after addition of the polyester resin to the coating bath. Preferably cross-linking agents, if used, are present in less than 1% based on the total solids weight as larger amounts can have a detrimental effect on heat seal strength. The coating composition is applied to one or more surfaces of the selected substrate using conventional apparatus such as a gravure roll or doctor roll.

The coating composition of this invention is particularly useful for forming a tack-free, heat-sealable barrier coating with excellent adhesion on an aromatic polyester film substrate. Representative polyester substrates include polycarbonates such as those prepared from bisphenol A; and 2,6 naphthalate polyesters. Preferred substrates include polyalkylene terephthalate polyesters prepared by reacting terephthalic acid (or a dialkyl ester thereof) with glycols of the series $HO(CH_2)_nOH$ where $n$ is an integer greater than 1 but not exceeding 10. Suitable glycols include ethylene glycol, trimethylene glycol, hexamethylene glycol and the like. Other functional compounds which can be reacted with terephthalic acid or with a dialkyl ester of terephthalic acid to produce linear polyester types, include p-xylene glycol, hydroquinone, and cyclic glycols. Other polymers which can be used include polyalkylene terephthalate-containing modifiers such as dibasic acids including among others, isophthalic acid, sebacic acid, adipic acid, sulfonated derivatives and the like. In a preferred embodiment, the coating composition is applied to a polyethylene terephthalate film which has been oriented by stretching in both the machine and transverse direction.

It has also been found that the coating compositions of this invention adhere to inorganic film coatings, such as aluminum phosphate or ferric phosphate barrier coats. Thus, if desired, one can first provide an inorganic coating on one side of a polyester film and then coat both sides with the modified saran composition by passing the film through a coating bath, kiss-coating both sides, or by using other conventional coating techniques. Polyester surfaces coated with the inorganic coating and topcoated with the modified saran coating tend, however, to have lower resistance to delamination than polyester surfaces directly topcoated with the modified saran composition. Therefore heat sealing should be accomplished on the saran surface directly contacting the polyesters, particularly when the sealed film will be subjected to stresses.

The films of this invention possess properties which make them admirably suited for use as packaging materials for foods such as fresh produce, meats, and baked goods, and for household products such as sponges and the like. In the example that follows, film properties are assessed by tests described in the following paragraphs.

IPV or initial permeability value is a measure of the water vapor permeability of the coated film using the test set forth in U.S. Pat. No. 2,147,180 issued Feb. 14, 1939. The IPV is a measure of the grams of water permeating through 100 square meters of film per hour at 39.5°C. In general, films having an IPV of 100 or less are considered to have satisfactory moisture-proof qualities.

OPV or oxygen permeability value is measured using an "Ox-tran 100" apparatus commercially available from Modern Controls, Inc. The OPV is a measure of the cubic centimeters of oxygen passing through 100 square inches of film surface in 24 hours under an oxygen pressure difference of one atmosphere.

Heat seal strength is measured by cutting a piece of the coated film 4 inches by 10 inches with the grain or machine direction of the film running in the long dimension of the sample into 2 pieces 4 inches by 5 inches each. The 2 pieces are superimposed so that opposite surfaces are in contact and then sealed together at each end at right angles to the grain by applying a 3/4 inch wide sealing bar under carefully controlled conditions of temperature (100°, 110° or 120°C. as indicated), pressure (2p.s.i.) and contact time (½ second). The sealed sheets are then cut in half at right angles to the grain. From the center of each of the two resulting pieces, two 1 inch wide strips parallel to the grain are cut. The resulting 4 sets of strips are tested by opening each set at the free end, placing them in a Suter testing machine, and pulling them apart. The highest force in grams required to pull the strips apart is taken as a measure of the heat seal bond strength. Heat seals are measured on the coated film as is, and/or after conditioning for 3 days at 35% or 81% relative humidity (RH), the latter test being a more severe test of the quality of the film coating.

EXAMPLE 1

A. Preparation of Coating Bath

The vinylidene chloride polymer used has the following monomer compositions: vinylidene chloride, 92 parts; acrylonitrile, 6 parts; methyl methacrylate, 2 parts; itaconic acid, 0.5 parts. The aromatic polyester used in preparing the coating bath was prepared by trans-esterifying the bis-(ethylene glycol) esters of terephthalic acid, isophthalic acid, adipic acid, and azelaic acid using a tetraisopropyl titanate catalyst and following the procedures of U.S. Pat. No. 2,892,747, Example 1. The molar proportions of dicarboxylic acid components or correspondingly the bis-(ethylene glycol) esters of the acids in the reaction mixture were about:

| | Mol Percent |
|---|---|
| Terephthalic acid | 40 |
| Isophthalic acid | 40 |
| Adipic acid | 10 |
| Azelaic acid | 10 |
| | 100 |

Each coating bath is prepared in a 5 liter flask equipped with a thermometer, stirrer, reflux condenser, and heater. Vinylidene chloride polymer, toluene, tetrahydrofuran, "Mistron" HGO-55 talc, "Sunoco" 3420 paraffin wax, and aromatic polyester are added to the flask. The flask is heated at 40° to 45°C. until the polymer is dissolved. Five coating compositions containing varying quantities of ingredients and prepared in this manner are recorded in Table 1.

TABLE 1

| | COMPOSITION | | | | |
|---|---|---|---|---|---|
| INGREDIENT | 1 | 2 | 3 | 4 | 5 |
| Vinylidene chloride polymer (grams) | 317.5 | 311 | 306 | 301 | 285 |
| Toluene (cc) | 597 | 597 | 597 | 597 | 597 |
| Tetrahydrofuran (cc) | 1080 | 1069 | 1062 | 1056 | 1031 |
| Aromatic Polyester[1] grams | — | 17.8 | 28.35 | 40.5 | 81 |
| WAX (grams) | 4.86 | 4.86 | 4.86 | 4.86 | 4.86 |
| Talc (grams) | 1.62 | 1.62 | 1.62 | 1.62 | 1.62 |

[1] Total weight polyester and tetrahydrofuran solvent; 40% polyester, 60% solvent by weight. Wt polyester as a percentage of wt vinylidene chloride for compositions 1–5 is, respectively, 0, 2.3%, 3.7%, 5.4%, and 11.4%.

B. Coating of Polyester Film

An 11 inch solvent coating tower is used to apply the coating bath to a ½ mil "Mylar" polyester film moving at 80 feet per minute. The coating bath is placed in a dip tank maintained at 40°C. and transferred to the film by a doctor roll. The doctor roll setting is 0.003 inch. Inlet and outlet tower temperatures are 130°C. and 80°C. respectively. Inlet and outlet tower air supply is 250 and 300 cubic feet per minute respectively.

The coating weight is determined by x-ray analysis and the coated samples are tested for heat seal both as is and after conditioning, and tested for water vapor permeability at both 91 and 100% relative humidity. Results are recorded in Tables 2 and 3.

TABLE 2

| COMPOSITION | COATING WEIGHT (g/M$^2$) | HEAT SEAL STRENGTH (g/1 inch)[1] | | | IPV, g/100 M$^2$/HR[2] at 39.5°C. | |
|---|---|---|---|---|---|---|
| | | 90°C./ 1/2 sec/ 2 psi | 100°C./ 1/2 sec/ 2 psi | 110°C./ 1/2 sec/ 2 psi | 91% RH | 100% RH |
| 1 | 3.04 | 105 | 123 | 127 | 32 | 31.5 |
| 2 | 3.00 | 125 | 167 | 211 | 41 | 50.5 |
| 3 | 2.82 | 173 | 170 | 230 | 40 | 47 |
| 4 | 3.08 | 145 | 182 | 187 | 54.5 | 58.5 |
| 5 | 2.68 | 102 | 203 | 143 | 78 | 90.5 |

[1] Average of 4 test values
[2] Average of 2 test values

TABLE 3

| COMPOSITION | CONDITIONED HEAT SEALS[3] | | | | | | | | | |
|---|---|---|---|---|---|---|---|---|---|---|
| | 120°C/ 1/2 sec/2 psi; 35%RH | | | | | 120°C/ 1/2 sec/2 psi; 81%RH | | | | |
| | 1 | 2 | 3 | 4 | Ave | 1 | 2 | 3 | 4 | Ave |
| 1 | 35 | 40 | 35 | 50 | 40 | 45 | 50$^a$ | 45 | 45 | 46 |
| 2 | 130 | 160 | 155 | 110$^a$ | 139 | 75 | 155$^a$ | 255$^a$ | 185$^a$ | 168 |
| 3 | 230$^a$ | 175$^a$ | 300$^a$ | 280$^a$ | 246 | 290$^a$ | 195$^a$ | 290$^a$ | 235$^a$ | 253 |
| 4 | 235 | 150$^a$ | 290$^a$ | 170 | 211 | 190$^a$ | 220 | 150$^a$ | 95 | 164 |
| 5 | 135$^a$ | 100 | 200$^a$ | 190$^a$ | 156 | 175$^a$ | 180 | 140$^a$ | 290$^a$ | 196 |

[3] Unless otherwise indicated, failure is in adhesion of coating to film. Superscript "a" indicates partial failure at coating-to-coating seal and partial failure at coating-to-film adhesion.

The data of Tables 2 and 3 shows that the coating becomes more pervious to water vapor as the quantity of aromatic polyester in the coating increases, and that the adhesive strength of coating to film increases with increased aromatic polyester content until a peak strength is reached, between compositions 2 and 4, at which point the adhesive strength decreases with additional aromatic polyester content.

EXAMPLE 2

A colloidal dispersion was prepared by combining 698 grams of aluminum chlorhydroxide, 412 grams of 86% phosphoric acid and 15.4 pounds of water. The dispersion was coated onto one side of a 0.5 mil biaxially oriented, heat set polyethylene terephthalate polyester film which has been flame treated on the side to be coated. The coated film was dried in a tower with a counter current air flow of 10 cfm/ft$^2$ of film. The film was first dried at about 35°C. for 8 seconds and then was heated at about 85°C. for 4 seconds. The coated film, after heating, had a coating weight of about 0.15 gram per square meter, an IPV of 25 and an OPV of 0.1 to 0.2.

This film was then topcoated on both sides with a bath containing:

| | |
|---|---|
| Saran (as identified in Example 1) | 300 grams |
| Aromatic polyester resin$^{(1)}$ | 1.5 grams |
| Aluminum silicate$^{(2)}$ | 3.0 grams |
| Paraffin wax (as identified in Example 1) | 4.5 grams |
| Toluene | 550 cc |
| Tetrahydrofuran | 1190 cc |

The coating tower was at about 100°C. and residence time in the tower was about 8 seconds. The doctor rolls were set to give a coating weight of about 3.2 grams saran per meter. OPV of the coated film was 0.02 and IPV was 10.

Four pieces of the coated film were cut for heat seal testing. In the first sample, heat sealing was polyester/saran to saran/polyester. In the second sample, heat sealing was polyester/AlPO$_4$ saran to saran/AlPO$_4$/polyester. Heat seal strengths, gram/inch, are $^{1.}$"Vitel" PE 100 by Goodyear Chemical Co.
$^{2.}$Flat Hydrite D, Georgia Kaolin Co., kaolin having a 4.5 micron median particle size, by weight as follows:

| | 100°F., 3 days, 80%RH | Room Temp, 3 days,35%RH |
|---|---|---|
| Sample 1 | 260 | 330 |
| Sample 2 | 30 | 310 |

I claim:
 1. A polyester film having an inorganic coating and an overcoating of a continuous, adherent, tack-free, heat-sealable coating containing:
 1. a copolymer of vinylidene chloride and at least one other ethylenically unsaturated monomer copolymerizable therewith, said copolymer containing at least 80% by weight of vinylidene chloride, and
 2. about 0.1 to 6% by weight, based on said vinylidene chloride copolymer, of a linear film-forming polyester having a molecular weight of at least about 500 prepared by condensing a glycol and a polyfunctional acid, at least 70% by weight of said polyfunctional acid being an aromatic polyfunctional acid.
 2. The coated film of claim 1 wherein the polyester film is polyethylene terephthalate and the linear polyester resin is the condensation product of
 a. at least one diol of the formula HOCH$_2$–(CH$_2$)$_x$–CH$_2$OH
 where $x$ is 0 to 10, and
 b. at least one diacid, wherein at least 70% by weight of said diacid is an aromatic diacid and up to 30% by weight of said diacid is an acyclic dicarboxylic acid of the formula HOOC—CH$_2$—X—CH$_2$—COOH
 where X is a chain of 2 to 8 carbon atoms.
 3. The coated film of claim 2 wherein the inorganic coating is aluminum phosphate or ferric phosphate.

* * * * *